United States Patent [19]

Stoffels

[11] Patent Number: 5,256,009
[45] Date of Patent: Oct. 26, 1993

[54] CUTTING INSERT FOR TOOLS

[75] Inventor: Karl-Heinz Stoffels, Meerbusch, Fed. Rep. of Germany

[73] Assignee: Sandvik Aktiebolag, Sandviken, Sweden

[21] Appl. No.: 778,840

[22] PCT Filed: Apr. 29, 1991

[86] PCT No.: PCT/EP91/00825

§ 371 Date: Dec. 24, 1991

§ 102(e) Date: Dec. 24, 1991

[87] PCT Pub. No.: WO91/17014

PCT Pub. Date: Nov. 14, 1991

[30] Foreign Application Priority Data

Apr. 28, 1990 [DE] Fed. Rep. of Germany ....... 4013717

[51] Int. Cl.$^5$ .............................. B23C 5/06; B23C 5/20
[52] U.S. Cl. ..................................... 407/42; 407/113
[58] Field of Search .................... 407/42, 61, 62, 113, 407/114

[56] References Cited

U.S. PATENT DOCUMENTS

| | | | |
|---|---|---|---|
| 3,541,655 | 11/1970 | Stier | 407/113 |
| 4,743,144 | 5/1988 | Shikata | 407/42 |
| 4,834,591 | 5/1989 | Tsujimura et al. | 407/113 |
| 4,840,518 | 6/1989 | Plutschuck et al. | 407/113 |
| 5,028,175 | 7/1991 | Pawlik | 407/40 |
| 5,035,546 | 7/1991 | Pawlik | 407/116 |
| 5,052,863 | 10/1991 | Satran | 407/113 |

FOREIGN PATENT DOCUMENTS

| | | |
|---|---|---|
| 0035848 | 9/1981 | European Pat. Off. . |
| 0334129 | 9/1989 | European Pat. Off. . |
| 0370494 | 5/1990 | European Pat. Off. . |

*Primary Examiner*—William E. Terrell
*Attorney, Agent, or Firm*—Tarolli, Sundheim & Covell

[57] ABSTRACT

A cutting insert (3) and a tool (1) for utilizing the cutting insert (3) for chip removal treatment of a workpiece. The cutting insert (3) has two base surfaces (9) and a plurality of side surfaces (13A,13B) which extend between the base surfaces (9). The base surfaces (9) have a trapezoidal shape and the side surfaces (13A,13B) have a rhomboid shape. Each of the side surfaces (13A,13B) has a chamfer (14A,14B) adjacent to one of the base surfaces (9) The edges between adjacent side surfaces (13A,13B) at the location of the chamfers (14A,14B) define main cutters (15). Each of the base surfaces has a conical chamfer (16) at each corner. The conical chamfers (16) define arcuate edges between the base surfaces (9) and the side surfaces (13A,13B) which are smoothing cutters (10A,10B). A plurality of cutting inserts (3) are removable attached to a surface of the tool (1) for engagement against the workpiece. The cutting inserts (3) are attached at a periphery and are rotated about an axis (A) of the tool (1).

7 Claims, 5 Drawing Sheets

← Feed direction (work piece)

CUTTING INSERT FOR TOOLS

The invention relates to a cutting insert and a tool for utilizing the cutting insert for chip removal treatment of a workpiece.

BACKGROUND OF THE INVENTION

For example cutting inserts find application with tools for the chip removal treatment of workpiece surfaces to be smoothing, such as by a cutterhead which can be rotated about an axis and which comprises several exchangeable cutting plates, having main cutting edges, wherein the cutting plates are arranged along its front surface in the area of its outer periphery, as well as a smoothing arrangement, wherein the lateral surface (axial outer surface) of each cutting plate facing away from the front surface of the cutterhead is inclined by a setting angle with respect to the cutterhead. Such cutterheads are used for the treatment of machine parts, in particular, such as motors. The rotational axis of the cutterhead is oriented essentially at a right angle to the workpiece surface to be treated. Slight deviations from a 90° orientation may result from a purposely provided spindle drop, a tilt error of the spindle, as well as the torque between the cutterhead and the workpiece. For this reason and for reasons of measuring and due to location deviations of the cutting plates and of the cutting plate sites on the cutterhead, the workpiece which is merely treated with the cutting plates, has a surface which, for many applications, is still too rough. For this reason, the cutterheads are provided with a smoothing device. In the case of known cutterheads, the latter consists, as a rule, of a single so-called broad smoothing plate per cutterhead, which, for example, in the position of one of the cutting plates of the cutterhead is used in the place of this cutting plate. Its essentially radially extending cutting edge must be oriented very precisely in the parallel direction to the treated workpiece surface. Irregularities in the cutting edge, imprecise installation of the broad smoothing plate, as well as fluctuating loads on the cutterhead, as they may occur, for example, at the beginning or at the end of a workpiece surface to be cut, are immediately translated into a decline in the surface quality of the treated workpiece.

Furthermore, the requirements with respect to the surface quality of machine parts and the like subjected to chip removal, have increased. For example, sealing surfaces must have better surfaces when less elastic and/or asbestos-free seals are used. Another problem lies in the increasingly realized weight reductions which lead to comparatively thin-walled workpieces. Thin-walled workpieces increasingly tend towards bending under the cutting pressure during cutting, which can lead to a certain waviness of the treated workpiece surface.

Based on this, it is the task of the invention to construct a cutting insert (bit) and a tool of the initially mentioned type in such a way that high surface quality is achieved when comparatively long edge lives of the turnover cutting plates are involved. Also particularly desirable is as a gentle cutting of the cutterhead, i.e., a cutting involving as little cutting pressure as possible.

SUMMARY OF THE INVENTION

The present invention is a cutting insert and a tool which utilizes the cutting insert for chip removal treatment of a workpiece surface. The cutting insert includes two base surfaces. Each base surface is of parallelogram shape and has four corners. The cutting insert includes four side surfaces. Each of the side surfaces extend between the two base surfaces. Each of the side surfaces intersect two adjacent side surfaces to define a plurality of side edges. Each of the side surfaces is trapezoidal shape.

A first pair of the side surfaces are inclined toward each other along a direction toward one of the base surfaces. A second pair of side surfaces are inclined toward each other along a direction toward another of the base surfaces. The first pair of side surfaces intersect the one of the base surfaces and the other pair of side surfaces intersect the other of the base surfaces to define a plurality of long edges. Each of the side surfaces have a chamfer located adjacent to a respective one of the long edges. Each of the side edges have a portion located adjacent to a respective chamfer and which defines a respective main cutter.

The first pair of the side surfaces intersect the other of the base surfaces and the second pair of the side surfaces intersecting the one of the base surfaces to define a plurality of short edges. Each of the short edges are convexly curved. Each of the short edges define a respective smoothing cutter for smoothing a portion of the workpiece previously cut by one of the main cutters. Each of the corners of each base surface having a conical chamfer. Each conical chamfer defines a convex curvature of the short edges.

The cutting inserts of the present invention are used in for carrying out chip-removing treatments of workpieces to be smoothed, as, for example, for facing cutterheads (cutterheads), large and small bore-grinding tools, fine boring tools, reaming tools.

By means of the invention, among others, the following advantages are achieved:

Each individual cutting plate serves simultaneously also as a smoothing device, for which reason relatively large advance speeds of the cutterhead can be realized without having a negative influence on the edge-life of the tool or of the cutting plates;

the geometric shape of the cutting plates remains comparatively simple, so that the production costs are not too high;

the cutting forces may be kept comparatively low;

breaks along the edge in the area where the cutting edge protrudes from the tool are relatively rare or minimal;

a single cutting plate has four main cutters as well as four accompanying smoothing cutters;

deviations in tolerances due to tolerances in the area of the cutting plates themselves or of the cutting plate supports of the cutterhead, as well as the occurrence of wear or errors in the smoothing cutters of individual cutting plates, already for that reason, have a comparatively minimal effect on the surface quality because the multitude of smoothing cutters per cutterhead leads to a compensation for the errors of individual smoothing cutters.

Due to the cutting plate geometry the wedge angle at the smoothing cutters is consistently smaller than 90°. Preferably, this wedge angle lies between 60° and 85°, particularly at 75°. In order to obtain such wedge angles, none of the cutting plate surfaces needs to be hollowed or to be provided in an appropriate manner with the chipping phases. This means that all cutting plate surfaces may be level or convex, which simplifies the manufacture of the cutting plates. Particularly in the case of the cutting plates with level surfaces, preferred so far, this cutting plate geometry is responsible for the fact that the cutting plates can be imbedded in a cutterhead in a particularly precise manner. In particular, with respect to the turnability of the cutting plates, this is an advantage since, despite the turnability, a high degree of installation precision and correspondingly good surface quality is achieved without the exchange or turning of the cutting blades necessitating a particularly involved positioning or alignment process.

The complementary angle of the wedge angle at 90°, which in the case of a preferred wedge angle of 75° also amounts to 15°, is preferably divided into the so-called setting angle and the so-called rake angle of the smoothing cutters. In that case, the setting angle is that angle which is formed by the lateral surface, axially facing away from the cutterhead, of each cutting plate together with the treated workpiece surface. Thus, the cutting plates are oriented nearly tangentially with respect to the treated workpiece surface, wherein the cutting plate incline which forms the setting angle with respect to the workpiece surface to be treated amounts to only a few degrees, preferably approximately 2 to 15 degrees and, particularly, 8°. If possible, the setting angle should be smaller than the complementary angle of the wedge angle at 90° in order to obtain, in a simple manner, an appropriate rake angle of the smoothing cutters. For this purpose, the rake angle is the angle of incline of the front surface of the cutting plate, extending in the work direction, with respect to the normal line on the treated workpiece surface. This angle is preferably between 2 and 15° and lies preferably near approximately 7°.

The chamfers can essentially be omitted since even without these chamfers the task on which the invention is based can essentially be solved and essential advantages of the invention are achieved. However, such chamfers are of great advantage during the multitude of applications, particularly when the angle of attack which the main cutters assume with the treated workpiece surface is not too great but, as preferred in accordance with the invention, lies between 20 and 60°. The smaller the angle of attack, in accordance with the cutting plate geometry, the shorter the smoothing cutters become, i.e., the short trapezoid sides and/or the longer the long trapezoid sides and thus the length and width of the cutting plates become. Without the chamfers, the angles of attack are always equal to the wedge angles because here an alternate angle is involved. Small wedge angles, for example those of less than 60°, are undesirable in most cases since, among other things, they are the most subject to wear and tear. Thus, by means of the chamfers while avoiding previously mentioned disadvantages, the angles of attack and the wedge angles can be freely selected in accordance with the respective demands. It is indeed conceivable to freely select the angle of attack between 15 and 70°, however, angles of attack between 30 and 40° have proven to be particularly advantageous. It was discovered that particularly small angles of attack lead to particularly good workpiece qualities at the outlet edges of the cutters. The smaller the angle of attack, the smaller the cutting depth achievable with the main cutter, while the cutting plate geometry is the same. In this respect, an angle of attack of approximately 30° has proven to be particularly advantageous. In accordance with the invention, it is also possible to use the part of the edge remaining outside the chamfers of the invention between adjacent front surfaces of the cutting plate for cutting purposes, i.e., as a secondary cutter or emergency cutter for (the achievement of) greater cutting depths.

By means of the convexly curved smoothing cutters, it is achieved that the smoothing cutter reaches the desired depth during the smoothing process only at one point or, depending on the wear, on a more or less short partial piece of its entire length. The convex curvature is indeed extraordinarily slight, so that between the inlet point or the outlet point and the deepest point of the smoothing cutter a difference in height of, as a rule, only a few hundredth millimeters exists. Since the smoothing edge course is circular during the first approach, a tilting of the cutting plate, due to measuring and/or location deviations or as a result of a spindle run-off, or due to the occurring cutting forces merely leads to the point at which a point other than the originally provided point along the smoothing cutter length is the deepest point; however, wherein the cutting depth of the smoothing cutter present at the workpiece always remains the same. The varying position of the lowest point, in the case of various cutting plates of the same cutterhead, or of another tool with a multitude of cutting inserts, has only a minimal influence on the recently achieved roughness of the processed workpiece surface; because each of the cutting plates distributed at the tool, particularly peripherally distributed, is provided with a smoothing cutter. In the case of a cutterhead with, for example, 50 cutting plates, the smoothing cutters of which are each 7 mm long, during one turn of the cutterhead a total smoothing length of maximally 350 mm is achieved. For this reason, the advance speed (relative speed between cutterhead and workpiece) can be varied on a large scale without this resulting in noticeable changes in the surface quality, particularly when these advance speeds move within the customary range of, for example, 3 to 20 mm per tool rotation. The curvature of the smoothing cutters is selected in such a way, that also during a most unfavorable constellation of the individual tolerances, the point of the smoothing cutters which with is the deepest with respect to the cutting depth lies between the inlet and outlet point of the smoothing cutter, i.e., between its beginning and end.

A gradually beginning wear of the smoothing cutters of a cutterhead leads to a somewhat reduced cutting depth which can be compensated for by means of an appropriate compensation of the axial position of the cutterhead. Other than that, such a wear results in that the smoothing cutters achieve the greatest working depth no longer at a single point but along an edge which is precisely surface-parallel to the treated workpiece. Such a grinding effect leads to an even further reduced roughness of the treated surface.

In order to achieve that during the treatment process the deepest point of the smoothing cutters possibly lies in the center of the smoothing cutter between its two end points, the smoothing cutter curvature is selected so that, while the tool is still not loaded, the axial/radial difference in height between the inlet point and the deepest point of the smoothing cutter is greater, particularly approximately twice as great as the difference in height between the outlet point and the deepest point of the smoothing cutter. In connection with a spindle drop and/or the torque effects on the tool during cutting/smoothing, the deepest point with respect to the workpiece of each smoothing cutter is located approximately in the center. At that point, the differences in height between the inlet point and the outlet point and the lowest point should be approximately equal. In this way, a particularly long edge-life of the respective smoothing cutters and consistently good surface quality of the treated workpiece are achieved.

Basically, the corners of the lateral surfaces of the cutting plates, i.e., the inlet and outlet points of the two smoothing cutters facing each other at a lateral surface of each cutting plate, can form any desired quadrangle. Also, cutting plates of this type essentially accomplish the task on which the invention is based. However, preferably, these four points form parallelograms which are particularly congruent. In the simplest case, these are rectangles. However, rhomboids are preferred, i.e., parallelograms with uneven sides. In the case of rhomboidal surfaces it is achieved that also behind the main cutters a sufficient setting angle can be realized without the radial inner end of the accompanying smoothing cutter preceding the radial outer end during the cutting/smoothing process. In particular, due to this cutting plate geometry, it becomes possible that the lowest point or area of the smoothing cutters in the work direction of the smoothing cutter always is the furthest in front. Generally, the rhomboid angles deviate by approximately 1° to 10°, and preferably by approximately 5° from the right angle.

If, in accordance with a further development of the invention, the lateral surfaces of the cutting plates are provided with a truncated cone-like chamfer, it is possible, in a comparatively simple manner, to achieve a geometrically exact and, in the case of all smoothing cutters of a cutting plate, equally convex curvature of the smoothing cutters, even when, as usually required, the curvature radii of the smoothing cutters are relatively large. In this way, it is possible with comparatively little effort to set the differences in height between the inlet points or the outlet points and the lowest points of the smoothing cutters to varying degrees (of magnitude).

Furthermore, all surfaces of the cutting plates may be manufactured completely level, wherein the one half and the other half, respectively, of the surfaces form edges which are parallel to each other. Also, the angles of the four front surfaces and of the four chamfers forming the main cutters, with respect to the two lateral surfaces of the cutting plates, which are preferably parallel to each other, are equally great. In this way, an extraordinarily efficient cutting plate geometry with comparatively few means or comparatively simple production processes can be realized, wherein a high degree of precision, i.e., minimal tolerance deviations can be realized.

The above-mentioned structural components and geometric ratios to be used in accordance with the invention are otherwise not subjected to special exceptional conditions, so that the selection criteria known in the respective area of application can find unlimited application.

BRIEF DESCRIPTION OF THE DRAWINGS

Further details, characteristics and advantages of the object of the invention result from the following description of the accompanying drawing in which a preferred arrangement of a cutterhead of the invention and of a cutting plate of the invention are shown by means of examples. In the drawing.

DESCRIPTION OF PREFERRED EMBODIMENT

Figure 1:
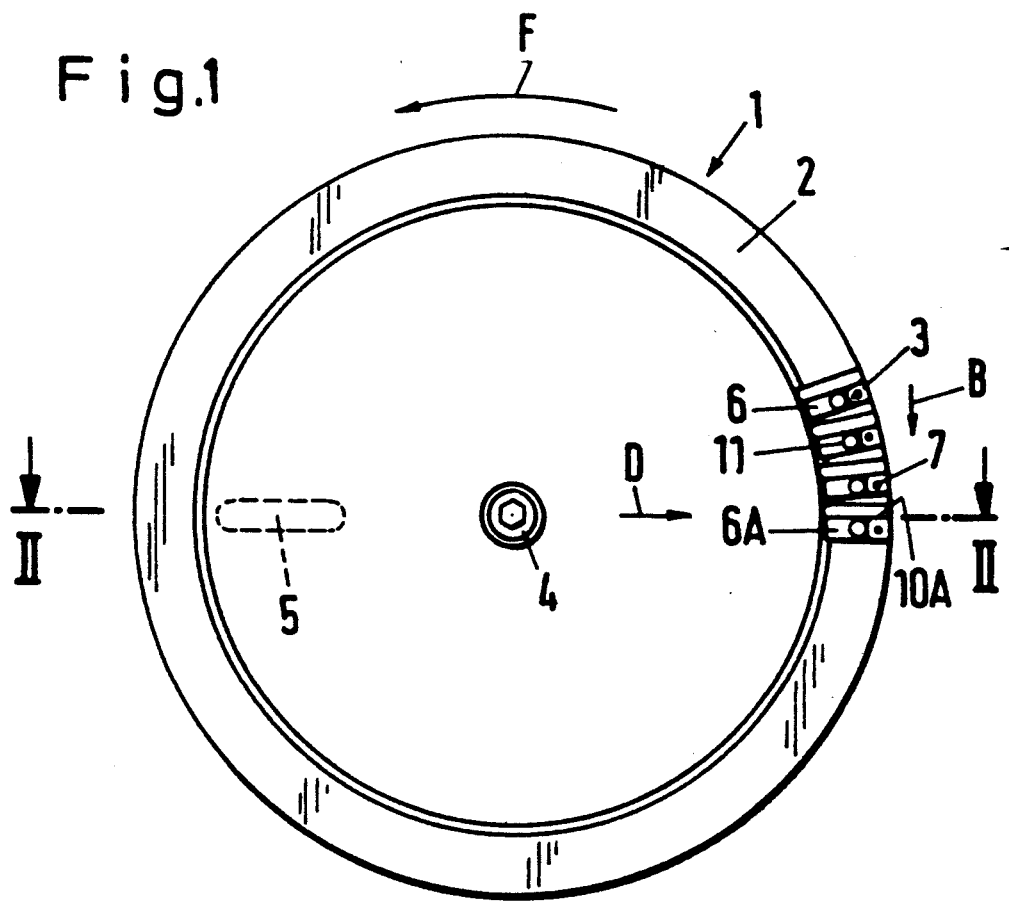
FIG. 1 shows a cutterhead of the invention in frontal view with four of a total of 50 cutting plates of the invention.

In FIG. 1, of a total of 50 identical cutting plates or inserts (3), made of hard metal and attached in equal distribution to the front face (2) of a cutterhead (1) in the peripheral area, only 4 pieces are shown. The cutterhead (1) can be attached by means of a central screw bolt (4) at the front end of the rotational axis of a milling machine, not shown. The transfer of the torque takes place by a recess (5) for accommodating a driving wedge, not shown. The cutting plates (3) can be inserted into form-fitted recesses (6) with parallel edges into the front face (2) of the cutterhead (1) and can be attached by means of a screw bolt (7). For the recessed accommodation of the screw bolt (7), each cutting plate (3) has a corresponding central hole (8) in its facing lateral surfaces (9). The edge of each cutting plate (smoothing cutter 10A), preceding in the direction of rotation (F of the cutterhead (1), is located in the installed state on a radius of the cutterhead (1). Accordingly, the recesses (6) are oriented for accommodating the cutting plates inside the cutterhead (1). This geometry can be realized with simple means and a high degree of precision. The support of the cutting plates (3) takes place in tangential direction (F) at the rear recess edge (6A), as viewed in the direction of rotation (F), of each recess (6). In radial direction, this support takes place by means of screw bolts (11), also form-fitted to the cutting plate geometry of form-fitted screw bolts (11). Each cutting plate has two lateral base surfaces (9) and four side surfaces (13A,13B). The side surfaces (13A,13B) are hereinafter referred to as front surfaces, because the cutting plate (3) can be arranged such that each side surface (13A,13B) can face front.

As can be seen from FIGS. 3 to 6, each cutting plate (3) has a rhomboid basic form, wherein the lateral surfaces (9), limited by the corners (inlet points 12A and outlet points 12B), represent rhomboids.

The four front faces (13A and 13B) are respectively congruent and have a trapezoid basic form, wherein the front surfaces (13A or 13B) are tilted in pairs with respect to the lateral surfaces (9). In the illustrated example which, so far, is preferred, this angle of incline (wedge angle alpha) amounts to 75°.

The long edges of each cutting plate formed, on the one hand, by the front faces (13A or 13B) together with the lateral surfaces (9), on the other hand, are each provided with parallel chamfers (14A or 14B), inclined at below 30° with respect to the lateral surfaces (9), wherein the edges formed by the adjacent front surfaces (13A and 13B) in the area of the chamfers (14A or 14B), form the four main cutters (15) of each cutting plate (3).

The short edges, formed together by the front surfaces (13A or 13B) and by the lateral surfaces (9) of the cutting plates (3) form the smoothing cutters (10A to 10D) which are convexly curved with a comparatively large radius of curvature of, for example, 400 mm. In the FIGS. 4 and 5, this curvature is shown in exaggerated form in order to illustrate the effect. This curvature is achieved in that the two lateral surfaces (9) are provided with truncated cone-like chamfers (16), arranged concentrically to the hole (8). The pointed angle of the corresponding truncated cone is comparatively large and amounts to, for example, between 175 and 179°. In the example shown, which is preferred so far, it amounts to 178°, so that the incline of the chamfers (16) with respect to the lateral surfaces (9), respectively amounts to only 1°. The interior limit line of the chamfers (16) is tangent to the smoothing cutters (10A to 10D) in a contact point (16A) which is nearer the outlet point (12B) than to the inlet point (12A) of each smoothing cutter. The lateral surfaces (9) respectively form in their basic form a rhomboid with a rhomboid angle of approximately 85°.

Figure 4:
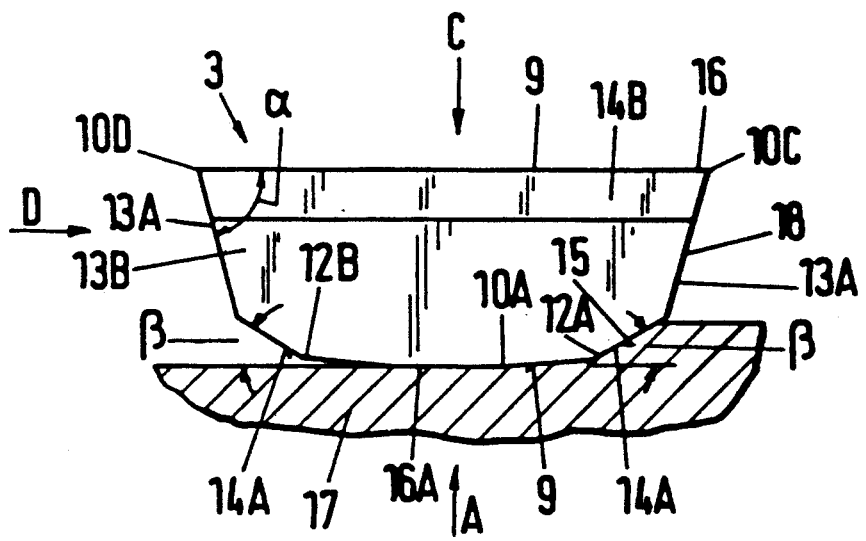
FIG. 4 shows the same cutting plate in a frontal view (view B according to FIG. 3) in connection with a workpiece in axial cross section which is to be treated.

From FIG. 4 it can be seen in which way a main cutter (15), in cooperation with the smoothing cutter (10A) connecting to it in (at) the inlet point (12A), treats (chips) a workpiece (17). Clearly, the angle of attack, beta, between the main cutter (15) and the treated workpiece surface amounts to approximately 30°.

Figure 5:
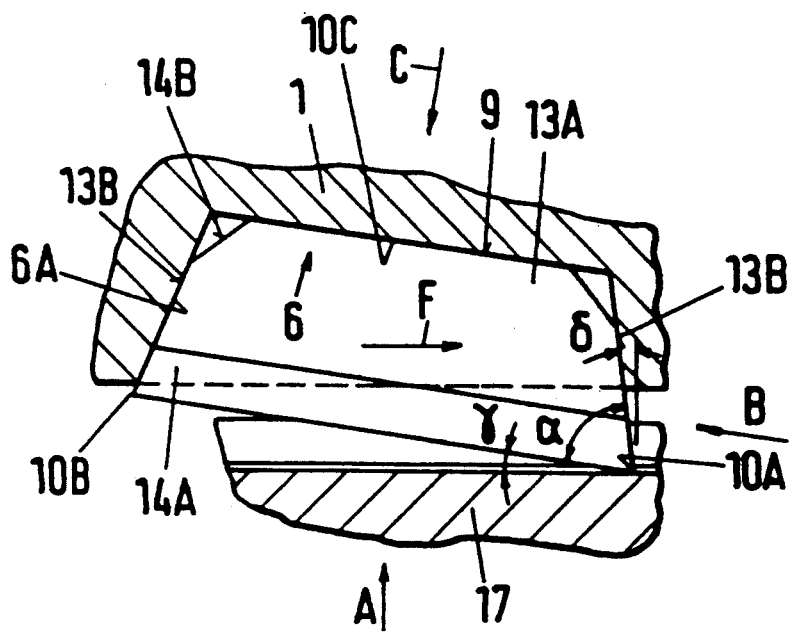
FIG. 5 shows an additional view of the same cutting plate (view D according to FIGS. 1 and 3) in conjunction with the installation geometry with respect to a cutterhead axis according to FIGS. 1 and 2 and of a workpiece to be treated, shown in axial cross section.
Figure 6:
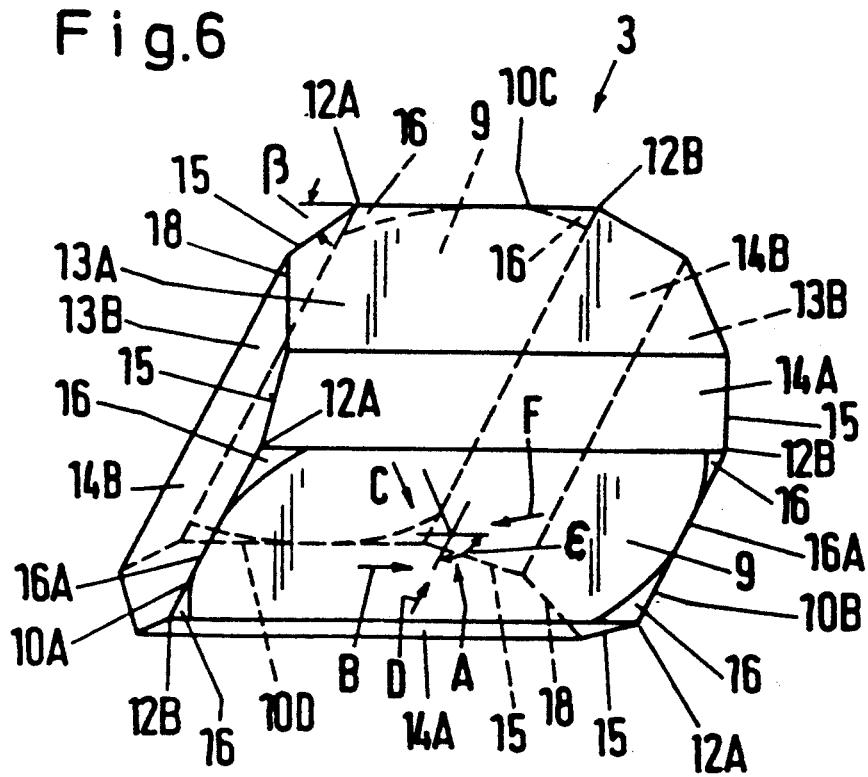
FIG. 6 shows a perspective view of the same cutting plate.

FIG. 5 shows a radial view of a cutting plate (viewed from the inside to the outside). The setting angle gamma, with respect to the treated surface of the workpiece (17), amounts to 8°. The rake angle delta, resulting with respect to the axial direction (A) of the cutterhead (1) to the cutting plate (3) amounts to 7°.

The contact edges, formed as an extension of the main cutters (15), of adjacent front surfaces (13A and 13B) of the cutting plate (3) may be in the form of secondary cutters (18).

It is understood that each cutting plate (3) rests in as holohedral a manner as possible against the walls of the recesses (6, 6A) of the cutterhead (1). This is schematically indicated in FIG. 5.

Figure 7:
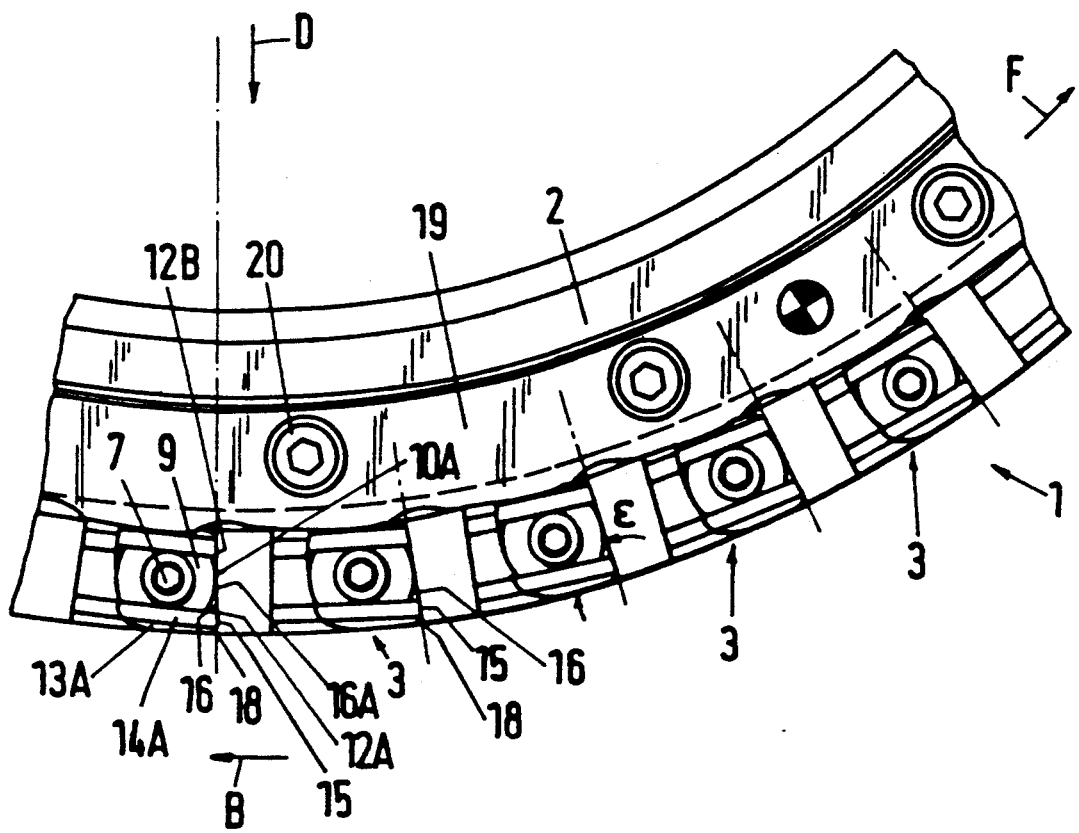
FIG. 7 shows sections of an arrangement which is an alternative to the cutterhead of FIG. 1.

In accordance with FIG. 7, the support of the cutting plates (3) can be undertaken in radially inward (direction) with respect to the cutterhead (1) instead of by means of individual screw bolts (as shown in FIG. 1) by means of a securing ring (19) or appropriately larger ring segments, which can be tightened by means of fastening screws (20) to the cutterhead (1). In this way, the radial contact surfaces of the cutting plates (3) can be produced in a particularly precise manner, so that it is less important for the screw bolts to be true to size than is the case in the example according to FIG. 1.

Figure 2:
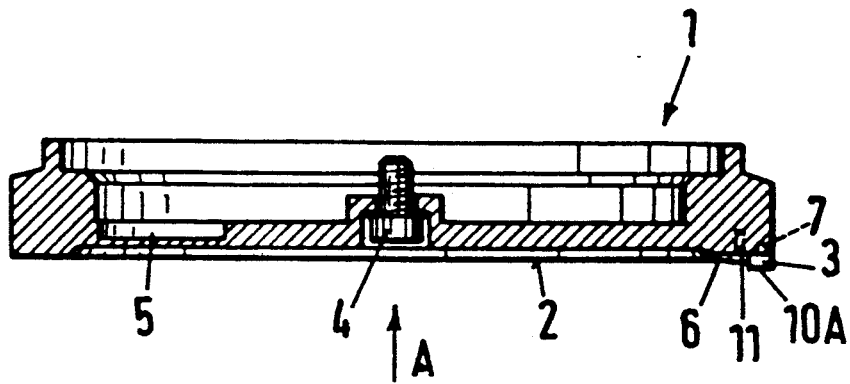
FIG. 2 shows the same cutterhead in axial cross section, a section along the line II—II according to FIG. 1.
Figure 3:
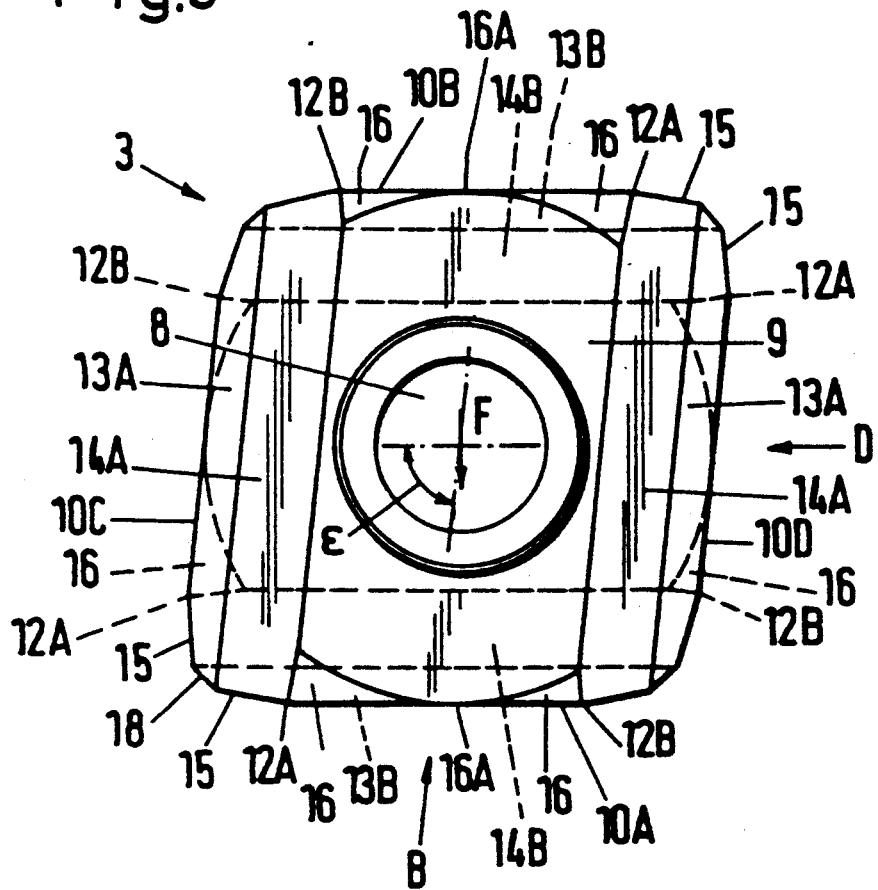
FIG. 3 shows a cutting plate of the invention, as used in the cutterhead according to FIGS. 1 and 2, in greatly enlarged sideview.
Figure 9:
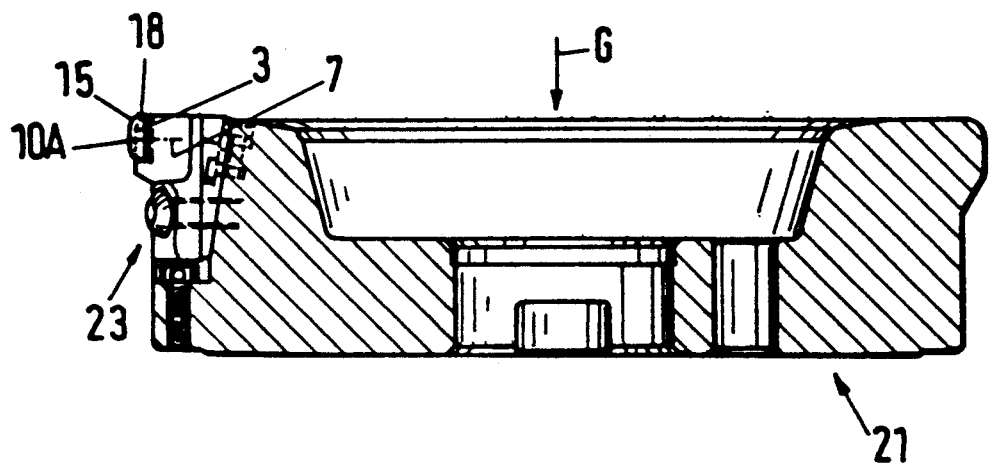
FIG. 9 shows an axial cross section of the same bore-grinding tool (cross section along the line IX—IX in accordance with FIG. 8).
Figure 8:
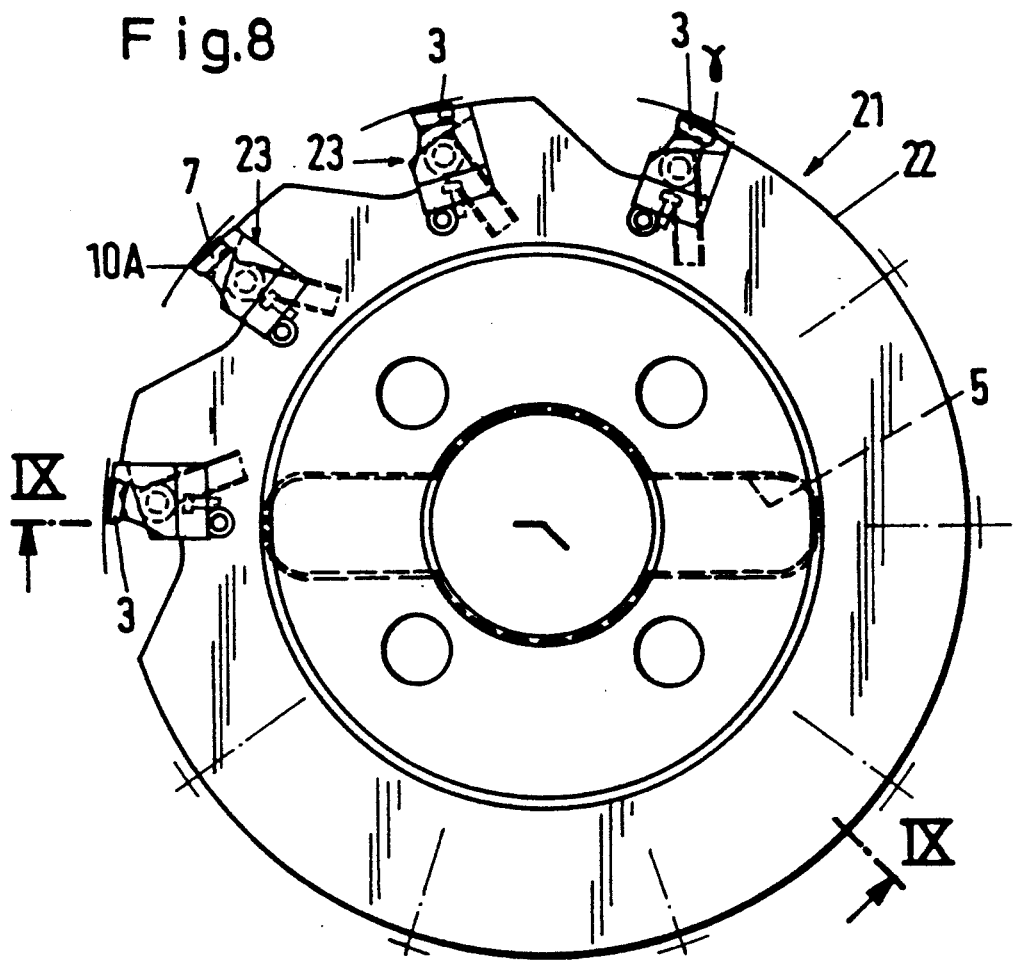
FIG. 8 shows a bore-grinding head in frontal view (view G according to FIG. 9)

In the case of the tool shown in FIGS. 8 and 9, namely a bore-grinding head, with which the bore grinding and smoothing of a cylinder wall takes place in a single work process, in ten positions evenly distributed along the periphery of the bore-grinding head (21), the same cutting inserts (3) as in FIGS. 3 to 6 are provided. For the sake of simplicity, only four of these ten positions are shown in detail. In contrast to the examples according to FIGS. 1, 2 and 7, the cutting plates (3) are not inserted in the front surfaces but in the cover surface (22), i.e., in such a way, that the smoothing cutters (10A) become effective in radial direction and not in the axial direction.

For the fixing (attachment) of each cutting plate (3), again a screw bolt (7) (indicated only by dotted lines) is used. The precise fit (location) and the support of each cutting plate (3) in tangential and radial direction (both are adjustable), is achieved by means of appropriate cutting plate mountings (23), as they are already known from the basic construction in German Patent No. 30 36 527 A1. Furthermore, the same structural components and angles or the like or those which are equal in their effect are provided with the same reference numbers as in the preceding examples.

List of reference symbols:
1 tool
A view/axial direction
2 front surface
B view
3 cutting plate
C view
4 screw bolt
D view
5 recess
F direction of rotation
6 recess
G view
6A recess edge
7 screw bolt
$\alpha$ wedge angle
8 hole
$\beta$ angle of attack
9 lateral surface
$\gamma$ Y setting angle
10A up to
$\delta$ rake angle
10D smoothing cutters
$\epsilon$ rhomboid angle
11 screw bolt
12A inlet point
12B outlet point
13A front surface
13B front surface
14A chamfer (bevel)
14B chamfer (bevel)
15 main cutter
16 chamfer (bevel)
16A contact point
17 workpiece
18 secondary cutter
19 securing ring
20 fastening screws
21 bore-grinding head
22 cover surface
23 cutting plate mounting

We claim:
1. A cutting insert (3) for a tool (1) for chip removal treatment of a workpiece surface, said cutting insert (3) comprising;
   a body, said body having first, second, third and fourth generally trapezoidal side surfaces (13A, 13B), said body having top and bottom lateral surfaces (9);

said first side surface (13A) intersecting said fourth side surface (13B) at a first edge, said first side surface (13A) intersecting said second side surface (13B) at a second edge, said second side surface (13B) intersecting said third side surface (13A) at a third edge, said third side surface (13A) intersecting said fourth side surface (13B) at a fourth edge, said fourth side surface (13B) intersecting said bottom surface (9) at a fifth edge, said second side surface (13B) intersecting said bottom surface (9) at a sixth edge, said first side surface (13A) intersecting said top surface (9) at a seventh edge, said third side surface (13A) intersecting said top surface (9) at an eighth edge, said first and third side surfaces (13A) being located on opposite sides of said body, said first and third side surfaces (13A) being inclined inwardly toward each other along a direction toward said bottom surface (9), said second and fourth side surfaces (13B) being located on opposite sides of said body, said second and fourth side surfaces (13B) being inclined inwardly toward each other along a direction toward said top surface (9);

said first side surface (13A) having a first chamfer (14A) adjacent said bottom surface (9), said second side surface (13B) having a second chamfer (14B) adjacent said top surface (9), said third side surface (13A) having a third chamfer (14A) adjacent said bottom surface (9), said fourth side surface (13B) having a fourth chamfer (14B) adjacent said top surface (9), said first edge at the first chamfer (14A) being a first main cutter (15), said first edge at the fourth chamber (14B) being a second main cutter (15), said third edge at the third chamfer (14A) being a third main cutter (15), said third edge at the second chamfer (14B) being a fourth main cutter (15), said top surface (9) having a parallelogram shape having four corners, said bottom surface (9) having a parallelogram shape having four corners, each of said corners on said top and bottom surfaces having a conical (16) chamfer such that each of said fifth to eighth edges are arcuate to form smoothing cutters (10A, 10B) for smoothing a portion of the workpiece surface previously cut by one of said main cutters (15).

2. A cutting insert as set forth in claim 1, wherein said top and bottom surfaces (9) each having a rhomboid shape.

3. A cutting insert as set forth in claim 1, wherein each of said side surfaces (13A, 13B) extending in a respective plane, said fifth to eighth edges being arcuate in a respective one of said planes.

4. A cutting insert (3) for a tool (1) for chip removal treatment of a workpiece surface, said cutting insert (3) comprising:

two base surfaces (9), each base surface (9) being of parallelogram shape and having four corners (12A, 12B); and four side surfaces (13A,13B), each of said side surfaces (13A,13B) extending between said two base surfaces (9), each of said side surfaces (13A,13B) intersecting two adjacent side surfaces (13A,13B) to define a plurality of side edges, each of said side surfaces (13A,13B) being of trapezoidal shape, a first pair of said side surfaces (13A) being inclined toward each other along a direction toward one of said base surfaces (9), a second pair of said side surfaces (13B) being inclined toward each other along a direction toward another of said base surfaces (9), said first pair of said side surfaces (13A) intersecting said one of said base surfaces (9) and said second pair of said surfaces (13B) intersecting said another of said base surfaces (9) to define a plurality of long edges, each of said side surfaces (13A,13B) having a chamfer (14A,14B) located adjacent a respective one of said long edges, each of said side edges having a portion located adjacent to a respective chamfer (14A,14B) and defining a respective main cutter (15), said first pair of side surfaces (13A) intersecting said another of said base surfaces (9) and said second pair of said side surfaces (13B) intersecting said one of said base surfaces (9) to define a plurality of short edges, each of said short edges being convexly curved and defining a respective smoothing cutter (10A–10D) for smoothing a portion of the workpiece previously cut by a respective one of said main cutters (15), each of said corners (12A,12B) of each base surface (9) having a conical chamfer (16), each conical chamfer (16) defining a convex curvature of said short edges, said curvature of each of said short edges extending in a plane of a respective one of said side surfaces.

5. A cutting insert as set forth in claim 4, wherein said base surfaces (9) each having a rhomboid shape.

6. A tool for chip removal treatment of a workpiece surface, said tool comprising:

a cutter head (1) rotatable about an axis (A), said cutter head (1) having a surface (2) for facing toward the workpiece surface, said surface of said cutting head (1) having an outer circumferential periphery which is rotatable about the axis (A); and a plurality of cutting inserts (3) for engaging and cutting the work piece surface, each of said cutting inserts (3) being removably attached to said surface (2) of said cutter head (1) at said outer circumferential periphery of said surface (2) of said cutter head (1);

each of said cutting inserts (3) having two base surfaces (9), each base surface (9) being of parallelogram shape and having four corners, each of said cutting inserts (3) having four side surfaces (13A,13B), each of said side (13A,13B) extending between said two respective base surfaces (9), each of said side surfaces (13A,13B) intersecting two respective adjacent side surfaces (13A,13B) to define a plurality of side edges, each of said side surfaces (13A,13B) being of trapezoidal shape, each of said cutting inserts (3) having a first pair of said side surfaces (13A) which are inclined toward each other along a direction toward a respective one of said base surfaces (9), each of said cutting inserts (3) having a second pair of said side surfaces (13B) which are inclined toward each other along a direction toward a respective another of said base surfaces (9), said first pair of said side surfaces (13A) intersecting said one of said respective base surfaces (9) and said second pair of said surfaces (13B) intersecting said another of said respective base surfaces (9) to define a plurality of long edges on each of said cutting inserts (3), each of said side surfaces (13A,13B) having a chamfer (14A,14B) located adjacent a respective one said long edges, each of said side edges having a portion located adjacent to a respective chamfer (14A,14B) and defining a respective main cutter (15), said first pair of side surfaces (13A) intersecting said another of said respective base surfaces (9) and said second pair of said surfaces (13B) intersecting said one of said respective base surfaces (9) to define a plurality of short edges on each of said cutting inserts (13), each of said short edges being convexly curved and defining a respective smoothing cutter (10A-10D) for smoothing a portion of the workpiece previously cut by one of said main cutters (15), each of said corners (12A,12B) of each base surface (9) having a conical chamfer (16), each conical chamfer (16) defining a convex curative of said short edges;

said one of said base surfaces (9) on each of said cutting inserts (3) facing away from said surface (2) of said cutter head (1) and toward the workpiece surface, said one of said base surfaces (9) on each of said cutting inserts (3) being inclined with respect to said cutter head (1) such that each of said one of said base surfaces (9) are inclined at a setting angle ($\gamma$) with respect to the workpiece surface when said cutting inserts (13) engage the workpiece surface.

7. A tool as set forth in claim 6, wherein each of said base surfaces (9) having a rhomboid shape.

* * * * *